(12) United States Patent
Liu et al.

(10) Patent No.: US 12,176,510 B2
(45) Date of Patent: Dec. 24, 2024

(54) BIPOLAR CAPACITOR ASSISTED BATTERY

(71) Applicant: GM GLOBAL TECHNOLOGY OPERATIONS LLC, Detroit, MI (US)

(72) Inventors: Jingyuan Liu, Shanghai (CN); Dewen Kong, Shanghai (CN); Zhe Li, Shanghai (CN); Meiyuan Wu, Shanghai (CN); Haijing Liu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 255 days.

(21) Appl. No.: 17/542,974

(22) Filed: Dec. 6, 2021

(65) Prior Publication Data
US 2023/0155213 A1 May 18, 2023

(30) Foreign Application Priority Data
Nov. 12, 2021 (CN) .......................... 202111338571.2

(51) Int. Cl.
| | |
|---|---|
| *H01M 16/00* | (2006.01) |
| *H01G 11/08* | (2013.01) |
| *H01G 11/28* | (2013.01) |
| *H01G 11/52* | (2013.01) |
| *H01G 11/56* | (2013.01) |
| *H01G 11/58* | (2013.01) |
| *H01M 10/0525* | (2010.01) |
| *H01M 50/51* | (2021.01) |

(52) U.S. Cl.
CPC ............ *H01M 16/00* (2013.01); *H01G 11/08* (2013.01); *H01G 11/28* (2013.01); *H01G 11/52* (2013.01); *H01G 11/56* (2013.01); *H01G 11/58* (2013.01); *H01M 10/0525* (2013.01); *H01M 50/51* (2021.01)

(58) Field of Classification Search
CPC .. H01M 16/00; H01M 10/0525; H01M 50/51; H01M 10/0562; H01M 10/0565; H01M 10/0566; H01M 2220/20; H01M 10/056; H01G 11/08; H01G 11/28; H01G 11/52; H01G 11/56; H01G 11/58; H01G 11/14; H01G 11/06; H01G 11/72; H01G 11/12; H01G 11/10; Y02E 60/13; H02J 7/345
USPC .......................................................... 429/9
See application file for complete search history.

(56) References Cited

U.S. PATENT DOCUMENTS

| | | |
|---|---|---|
| 6,579,327 B1 | 6/2003 | Shiue et al. |
| 2005/0069768 A1 | 3/2005 | Martinet et al. |
| | (Continued) | |

FOREIGN PATENT DOCUMENTS

| | | | |
|---|---|---|---|
| CN | 103534133 A | 1/2014 | |
| DE | 60210175 T2 | 12/2006 | |
| JP | 2013201170 A | * 10/2013 | ........... C01B 32/312 |

OTHER PUBLICATIONS

Espacenet English Translation of JP2013201170A (Year: 2023).*

(Continued)

*Primary Examiner* — James M Erwin
*Assistant Examiner* — Kevin Nguyen

(57) ABSTRACT

A bipolar capacitor assisted battery includes a bipolar capacitor including a first capacitor, and a second capacitor. The second capacitor is connected in series with the first capacitor. A lithium ion battery is connected in parallel to the bipolar capacitor.

20 Claims, 7 Drawing Sheets

(56) References Cited

U.S. PATENT DOCUMENTS

| | | | | |
|---|---|---|---|---|
| 2012/0034521 A1* | 2/2012 | Matsuyama | ...... | H01M 10/0525 |
| | | | | 429/211 |
| 2012/0237799 A1* | 9/2012 | Jiang | ........................ | B60L 3/04 |
| | | | | 429/7 |
| 2013/0213677 A1* | 8/2013 | Zhamu | .................. | H01G 11/06 |
| | | | | 173/217 |
| 2017/0256833 A1* | 9/2017 | Ciaccio | ................ | H01M 16/00 |
| 2020/0126735 A1* | 4/2020 | Johnson | ................ | H01G 11/82 |

OTHER PUBLICATIONS

Bipolar Capacitor Replacement Electronic Guidebook (Year: 2021).*
Office Action dated Apr. 3, 2024 from German Patent Office for German Patent No. 102021131712.6; 9pgs.

\* cited by examiner

BIPOLAR CAPACITOR ASSISTED BATTERY

CROSS-REFERENCE TO RELATED APPLICATIONS

This application claims the benefit of Chinese Patent Application No. 202111338571.2, filed on Nov. 12, 2021. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to batteries and more particularly to capacitor assisted batteries.

Hybrid and electric vehicles include one or more motors that are powered by a battery system and that propel the vehicle. The battery system can be recharged using utility power, by another vehicle, during regeneration and/or by an internal combustion engine (for hybrid vehicle applications). During operation of the hybrid and/or electric vehicle, power that is generated during braking of the vehicle may be used to recharge a battery system of the vehicle. Instead of braking the vehicle using mechanical brakes, the motor is operated as a generator to brake the vehicle and to generate power that is used to recharge the battery system.

SUMMARY

A bipolar capacitor assisted battery includes a bipolar capacitor including a first capacitor and a second capacitor. The second capacitor is connected in series with the first capacitor. A lithium ion battery is connected in parallel to the bipolar capacitor.

In other features, the bipolar capacitor includes a first positive terminal. The first capacitor includes a first capacitor electrode connected to the first positive terminal. A first separator is connected to the first capacitor electrode. A first anode is connected to the first separator. A current collector is connected to the first anode. The second capacitor comprises a second capacitor electrode connected to the current collector, a second separator connected to the second capacitor electrode, and a second anode. A first negative terminal is connected to the second anode.

In other features, the lithium ion battery comprises a third anode connected to the first negative terminal, a third separator connected to the third anode and a first cathode connected to the third separator. A second positive terminal is connected to the first cathode. A second cathode is connected to the second positive terminal. A fourth separator is connected to the second anode. A fourth anode is connected to the fourth separator. A second negative terminal is connected to the fourth anode. A fifth anode is connected to the second negative terminal. A fifth separator is connected to the fifth anode. A third cathode is connected to the fifth separator. A third positive terminal is connected to the third cathode. A fourth cathode is connected to the third positive terminal. A sixth separator is connected to the fourth cathode. A sixth anode is connected to the sixth separator.

In other features, a blocking material is arranged on at least the first separator of the first capacitor and the second separator of the second capacitor. The bipolar capacitor uses a first liquid electrolyte and the lithium ion battery uses the first liquid electrolyte.

In other features, the bipolar capacitor uses a first liquid electrolyte and the lithium ion battery uses a second liquid electrolyte that is different than the first liquid electrolyte. The bipolar capacitor uses a liquid electrolyte and the lithium ion battery uses a solid electrolyte. The bipolar capacitor uses a solid electrolyte and the lithium ion battery uses a liquid electrolyte. The bipolar capacitor uses a solid electrolyte and the lithium ion battery uses a solid electrolyte.

In other features, the lithium ion battery is bipolar and includes M lithium ion batteries connected in series, where M is an integer greater than one. The lithium ion battery comprises a third anode connected to the first negative terminal. A third separator is connected to the third anode. A first cathode is connected to the third separator. A first current collector is connected to the first cathode. A fourth anode is connected to the first current collector. A fourth separator is connected to the fourth anode. A second cathode is connected to the fourth separator. A second current collector connected to the second cathode. A fifth anode is connected to the second current collector. A fifth separator is connected to the fifth anode. A third cathode is connected to the fifth separator. A second positive terminal is connected to the third cathode.

In other features, a blocking material is arranged on at least the first separator, the second separator and the third separator of the lithium ion battery. The bipolar capacitor uses a first liquid electrolyte and the lithium ion battery uses the first liquid electrolyte.

In other features, the bipolar capacitor uses a first electrolyte and the lithium ion battery uses a second electrolyte that is different than the first electrolyte. The bipolar capacitor uses a first liquid electrolyte and the lithium ion battery uses a second liquid electrolyte that is different than the first liquid electrolyte. The bipolar capacitor uses a solid electrolyte and the lithium ion battery uses a liquid electrolyte. The bipolar capacitor uses a liquid electrolyte and the lithium ion battery uses a solid electrolyte. The bipolar capacitor uses a solid electrolyte and the lithium ion battery uses a solid electrolyte.

In other features, the bipolar capacitor comprises a lithium ion capacitor (LIC).

In other features, the bipolar capacitor comprises an electric double layer capacitor (EDLC).

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

While a bipolar capacitor assisted battery (BCAB) is described below for a battery system of a battery electric vehicle, the bipolar capacitor assisted battery can be used in hybrid or other vehicles and/or in non-vehicle applications.

A capacitor assisted battery (CAB) includes a capacitor connected in parallel to a battery such as a lithium-ion battery (LIB). CABs can be used in high power output applications up to about 4V. Currently the CABs use relatively low-voltage chemistry, such as lithium ion phosphate (LFP)/graphite (Gr) and active carbon (AC). Use of CABs in higher voltage designs greater than about 4.25V is limited by the capacitor in the CAB, which has low stability at high voltage and generates gas (especially when subjected to both elevated temperatures and high voltages).

A bipolar capacitor assisted battery (BCAB) according to the present disclosure improves the stability of CABs and extends the usage of CABs to high-voltage chemical system with longer cycle life and enhanced power output as compared to LIBs without changing cell chemistry.

The BCAB according to the present disclosure combines a bipolar-type capacitor and a Li-ion battery. Two or more capacitors are connected in series and then connected in parallel to a lithium-ion battery. The BCABs according to the present disclosure improve the electrochemical stability of CABs and extend the usage of CABs at higher voltage.

In a CAB, the capacitor and the LIB are connected in parallel in a battery cell such as a pouch-type battery cell. In this configuration, $V_{cell} = V_C = V_{LIB}$. The stable window of the capacitor is narrower than the LIB. For example, if $V_C < 4.0$ V, the LIB cannot adopt a high-voltage system that is greater than or equal to 4V, such as NCM811/Gr or $LiNi_{0.5}Mn_{1.5}O_4$/Gr.

To address this situation, the voltage of LIB can be limited (which reduces energy density), LIB chemistry can be limited (which reduces energy density), and/or complex control systems with switches can be used to control voltage across the capacitor (which increases cost and complexity).

In the BCAB, N capacitors are connected in series and then connected in parallel to the LIB. When N=2 capacitors are used, $V_{cell} = 2 \times V_C = V_{LIB}$. The sum of the voltage of the two or more capacitors equals to the voltage of the LIB. For example only, the LIB with lithium nickel cobalt manganese oxides (NCM)/Gr has voltage of about 4.4V. When 2 capacitors are connected in series to the LIB, each capacitor works below about 2.2V, which is a safe voltage. For a LIB with lithium nickel manganese oxide (LNMO)/Gr, the voltage is ~5V and the voltage of each capacitor is 2.5V, which is still a safe voltage. As can be appreciated, the BCAB according to the present disclosure enables high voltage use of CABs, enables high voltage LIB chemistry, enhances energy density, and avoids the use of switches.

Figure 1:
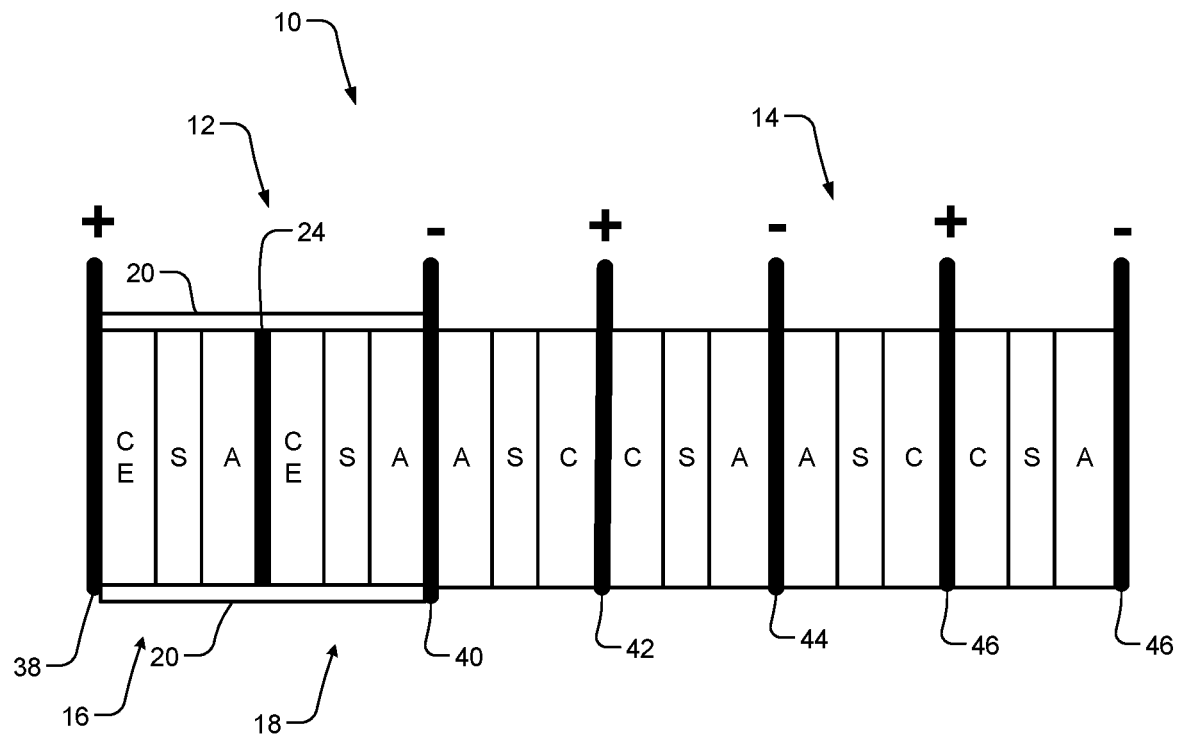
FIG. 1 illustrates an example of a bipolar capacitor assisted battery (BCAB) including a bipolar capacitor and a Li-Ion battery (LIB) according to the present disclosure.
Figure 2:
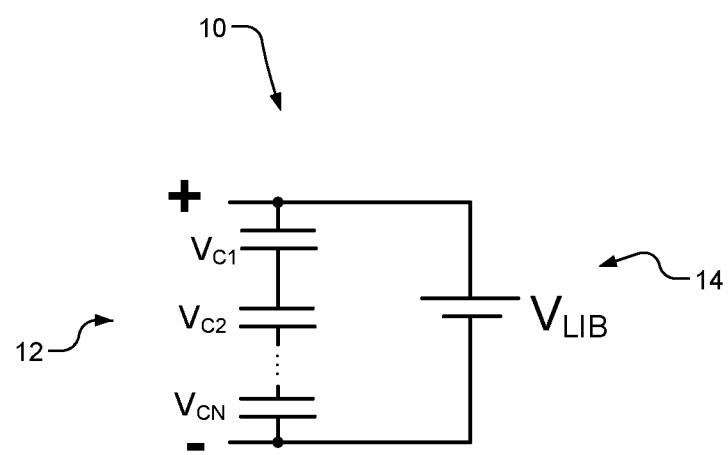
FIG. 2 is an electrical schematic of the BCAB of FIG. 1.

Referring now to FIGS. 1 and 2, a bipolar capacitor assisted battery (BCAB) 10 and an equivalent circuit are shown, respectively. In FIG. 1, the BCAB 10 includes a bipolar capacitor 12 and a lithium ion battery (LIB) 14. In this example, the bipolar capacitor 12 comprises N capacitors connected in series (N is an integer greater than one). In order of adjacent layers from left to right, the bipolar capacitor 12 includes a positive terminal 38, a first capacitor 16 including a capacitor electrode (CE), a separator (S), and an anode (A), a current collector 24, a second capacitor 18 including a capacitor electrode (CE), a separator (S), and an anode (A), and a negative terminal 40. In some examples, a blocking material 20 may be used to prevent exposure and/or mixing of electrolyte. The blocking material 20 may extend over an exposed outer surface of the bipolar capacitor 12 or limited to exposed edges of the separators S of the bipolar capacitor 12, The LIB 14 abuts the negative terminal 40 and includes (in order of adjacent layers from left to right) an anode (A), a separator (S), a collector (C), positive terminal 42, a collector (C), a separator (S), an anode (A), a negative terminal 44, an anode (A), a separator (S), a collector (C), a positive terminal 46, a collector (C), a separator (S), an anode (A), and a negative terminal 48.

In FIG. 2, the BCAB 10 includes N series connected capacitors providing $V_{C1}, V_{C2}, \ldots,$ and $V_{CN}$ (where N is an integer greater than one). The series connected capacitors are connected in parallel to the LIB (providing $V_{LIB}$). Since the N capacitors are connected in parallel, each of the capacitors only needs to withstand 1/N of the voltage of the LIB.

Figure 3:
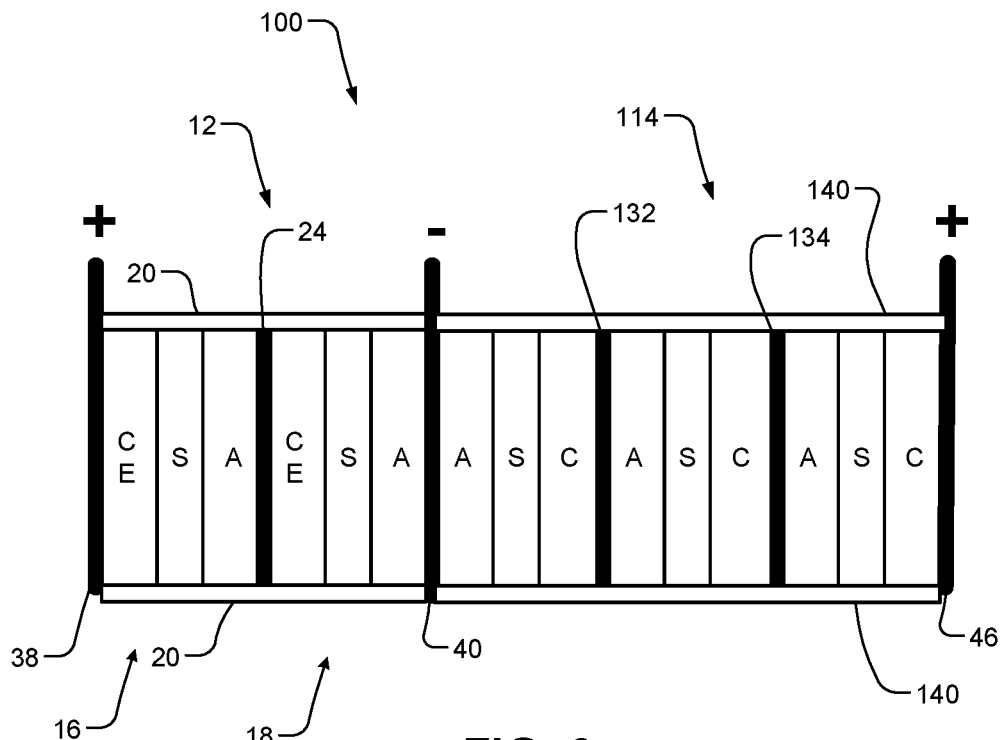
FIG. 3 illustrates an example of a bipolar capacitor assisted battery (BCAB) including a bipolar capacitor and a bipolar Li-Ion battery (LIB) according to the present disclosure.
Figure 4:
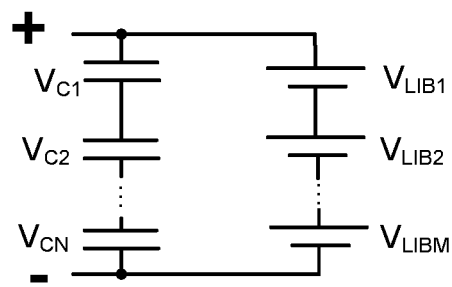
FIG. 4 is an electrical schematic of the BCAB of FIG. 3.

Referring now to FIGS. 3 and 4, a bipolar capacitor assisted battery (BCAB) 100 and an equivalent circuit are shown, respectively. In FIG. 1, the BCAB 100 includes the bipolar capacitor 12 described in FIG. 1 and a bipolar Li-Ion battery (LIB) 114.

The LIB 114 abuts the negative terminal 40 of the bipolar capacitor 12 and includes (in order of adjacent layers from left to right) an anode (A), a separator (S), a collector (C), a current collector 132, an anode (A), a separator (S), a collector (C), a current collector 134, an anode (A), a separator (S), a collector (C), and a negative terminal 136. In some examples, a blocker 140 may be used to prevent mixing and/or exposure of the electrolyte and/or exposure to the higher potential of the bipolar LIB.

In FIG. 4, the BCAB 100 includes N series connected capacitors providing $V_{C1}, V_{C2}, \ldots,$ and $V_{CN}$. The series connected capacitors are connected in parallel to M series-connected LIBs providing $V_{LIB1}, V_{LIB2}, \ldots,$ and $V_{LIBM}$. N and M are integers greater than one. In various examples, N<M, N>M or N=M.

Figure 5:
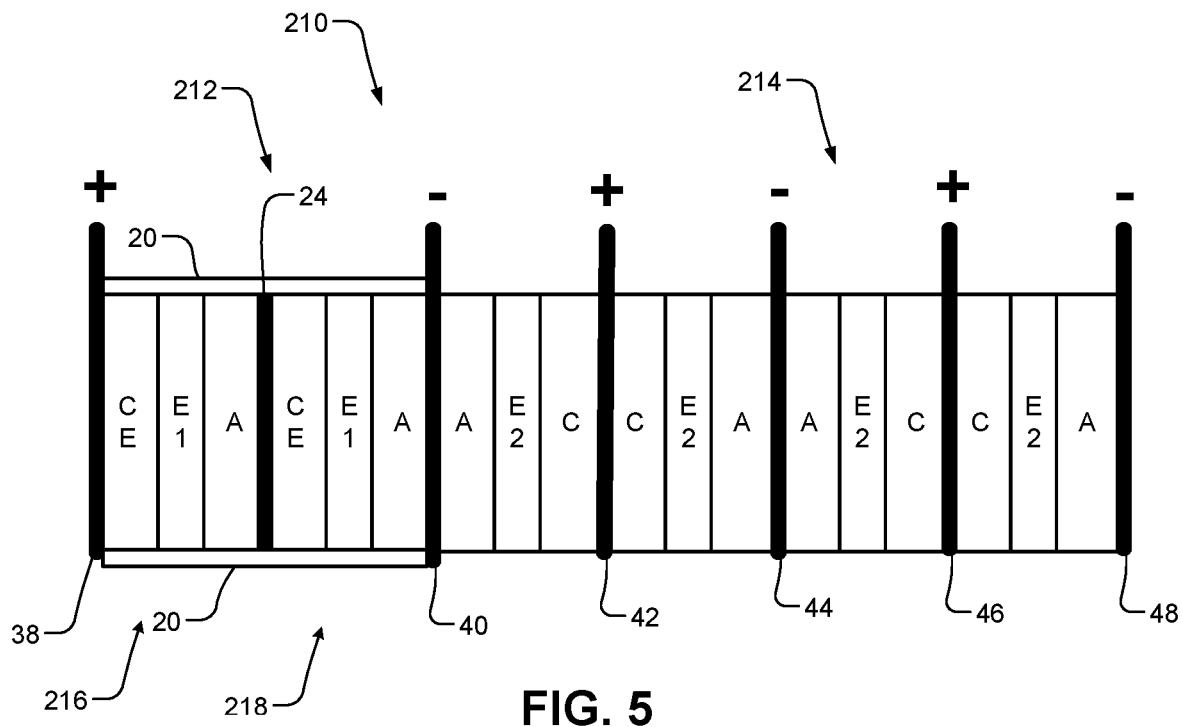
FIGS. 5-12 illustrate additional examples of BCABs according to the present disclosure.
Figure 6:
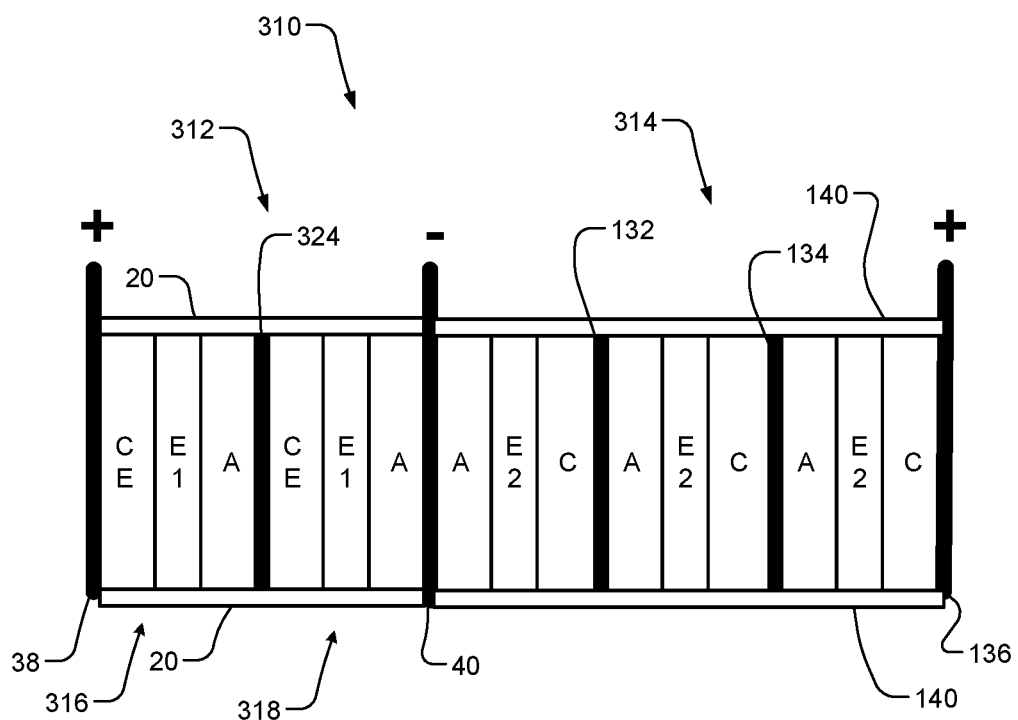

Referring now to FIGS. 5 and 6, the bipolar capacitor and the LIB (or bipolar LIB) can use different liquid electrolyte. In FIG. 5, a BCAB 210 includes a bipolar capacitor 212 and a LIB 214. The bipolar capacitor 212 comprises (in order of adjacent layers from left to right) a positive terminal 38, a first capacitor 216 including a capacitor electrode (CE), a first liquid electrolyte (E1), and an anode (A), the current collector 24, a second capacitor 218 including a capacitor electrode (CE), the first liquid electrolyte (E1), and an anode (A), and the negative terminal 40.

The LIB 214 abuts the negative terminal 40 and includes (in order of adjacent layers from left to right) an anode (A), a second liquid electrolyte (E2), a collector (C), the positive terminal 42, a collector (C), the second liquid electrolyte (E2), an anode (A), the negative terminal 44, an anode (A), the second liquid electrolyte (E2), a collector (C), the positive terminal 46, a collector (C), the second liquid electrolyte (E2), an anode (A), and the negative terminal 48. The first and second liquid electrolytes are different.

In FIG. 6, the BCAB 310 includes a bipolar capacitor 312 and a bipolar Li-Ion battery (LIB) 314. The bipolar capacitor 312 comprises (in order of adjacent layers from left to right) the positive terminal 38, a first capacitor 316 including a capacitor electrode (CE), a first liquid electrolyte (E1), and an anode (A), the current collector 24, a second capacitor 318 including a capacitor electrode (CE), the first liquid electrolyte (E1), and an anode (A), and the negative terminal 40.

The LIB 314 abuts the negative terminal 40 of the bipolar capacitor 312 and includes (in order of adjacent layers from left to right) an anode (A), a second liquid electrolyte (E2), a collector (C), the current collector 132, an anode (A), the second liquid electrolyte (E2), a collector (C), the current collector 134, an anode (A), the second liquid electrolyte (E2), a collector (C), and the negative terminal 136.

Figure 7:
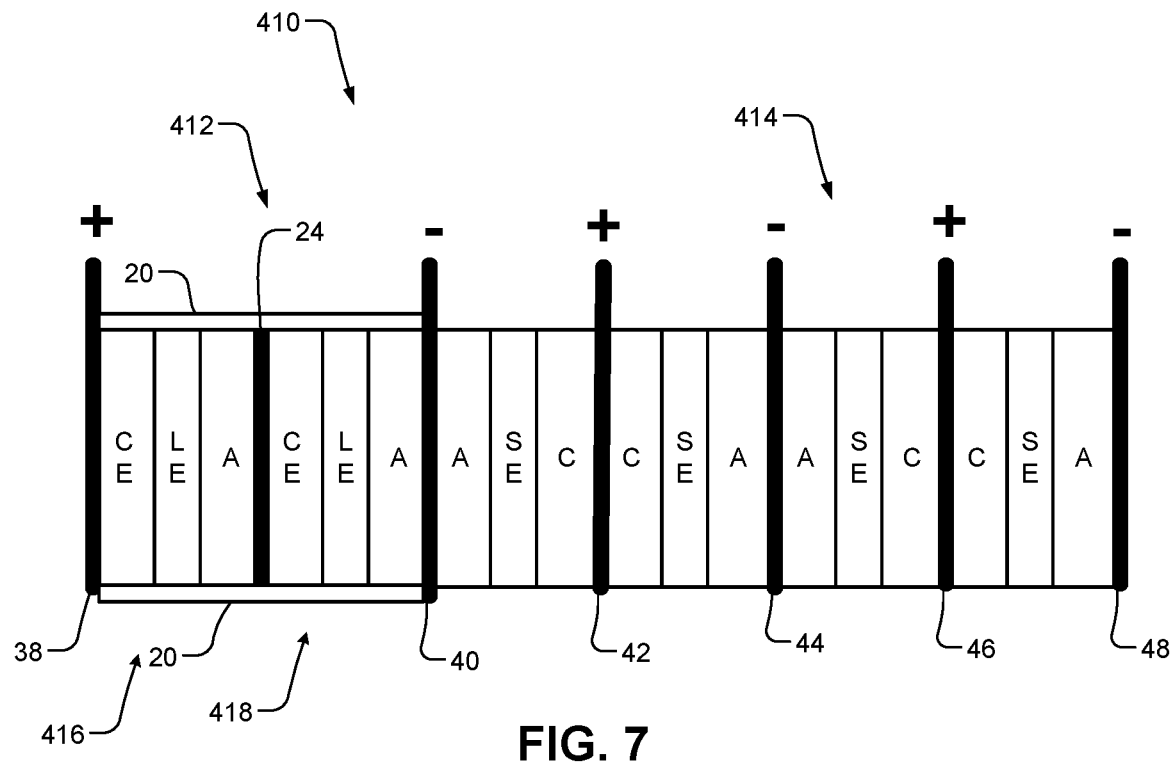
Figure 8:
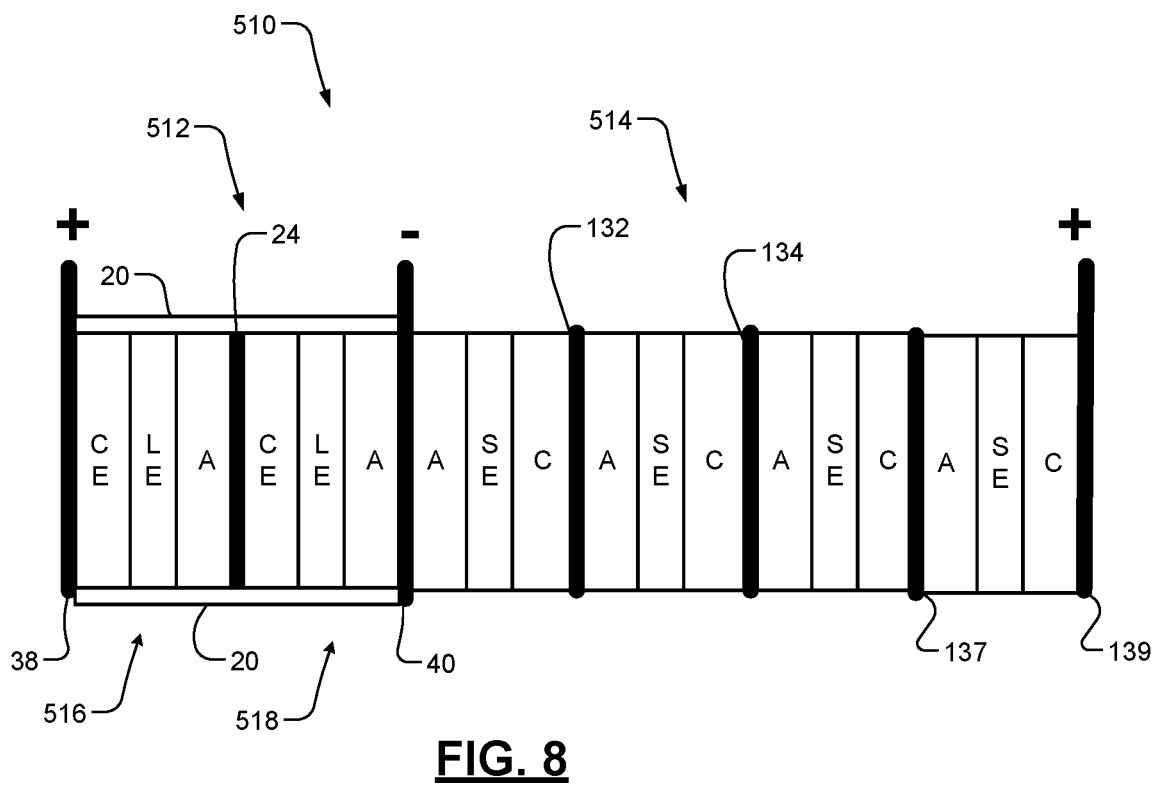

Referring now to FIGS. 7 and 8, the bipolar capacitor and the LIB (or bipolar LIB) can use liquid and solid electrolyte, respectively. In FIG. 7, a BCAB 410 includes a bipolar capacitor 412 and a LIB 414. The bipolar capacitor 412 comprises (in order of adjacent layers from left to right) the positive terminal 38, a first capacitor 416 including a capacitor electrode (CE), a liquid electrolyte (LE), and an anode (A), the current collector 24, a second capacitor 418 including a capacitor electrode (CE), the liquid electrolyte (LE), and an anode (A), and the negative terminal 40.

The LIB 414 abuts the negative terminal 40 of the bipolar capacitor 412 and includes (in order of adjacent layers from left to right) an anode (A), a solid electrolyte (SE), a collector (C), the positive terminal 42, a collector (C), the solid electrolyte (SE), an anode (A), the negative terminal 44, an anode (A), the solid electrolyte (SE), a collector (C), the positive terminal 46, a collector (C), the solid electrolyte (SE), an anode (A), and the negative terminal 48.

In FIG. 8, the BCAB 510 includes a bipolar capacitor 512 and a bipolar Li-Ion battery (LIB) 514. The bipolar capacitor 512 comprises (in order of adjacent layers from left to right) the positive terminal 38, a first capacitor 516 including a capacitor electrode (CE), a liquid electrolyte (LE), and an anode (A), the current collector 24, a second capacitor 518 including a capacitor electrode (CE), the liquid electrolyte (LE), and an anode (A), and the negative terminal 40.

The LIB 514 abuts the negative terminal 40 of the bipolar capacitor 512 and includes (in order of adjacent layers from left to right) an anode (A), a solid electrolyte (SE), a collector (C), the current collector 132, an anode (A), the solid electrolyte (SE), a collector (C), the current collector 134, an anode (A), the solid electrolyte (SE), a collector (C), the current collector 137, an anode (A), the solid electrolyte (SE), a collector (C), and the negative terminal 139.

Figure 9:
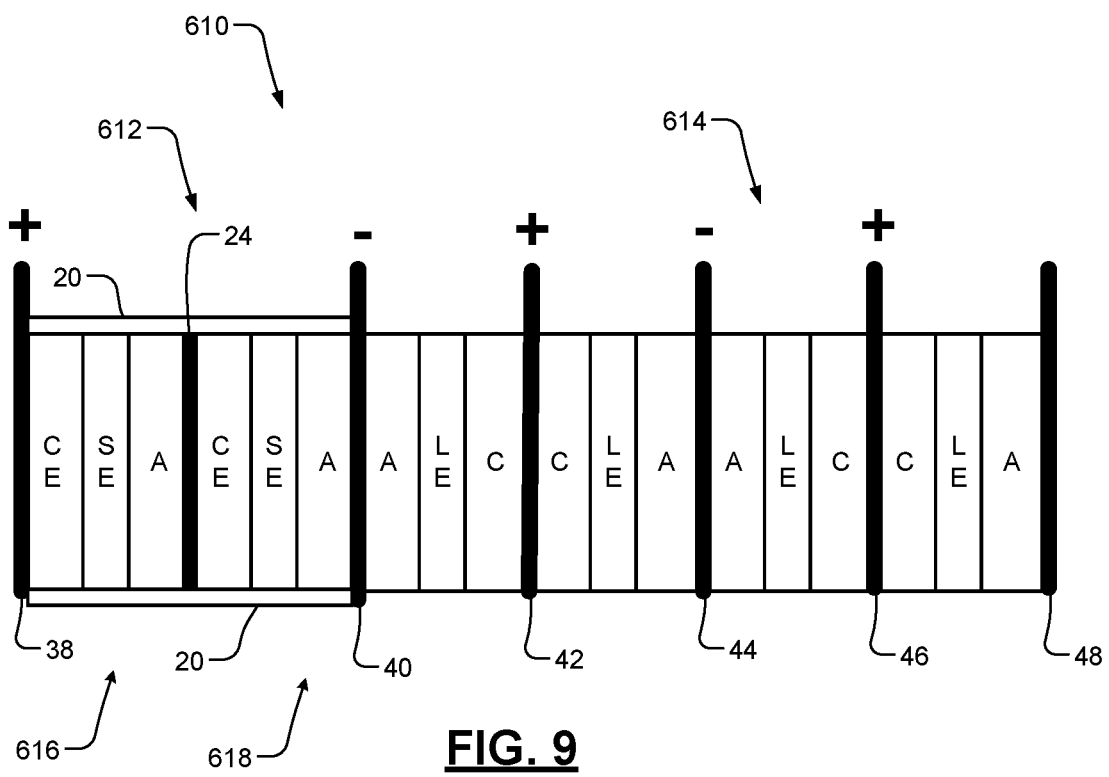
Figure 10:
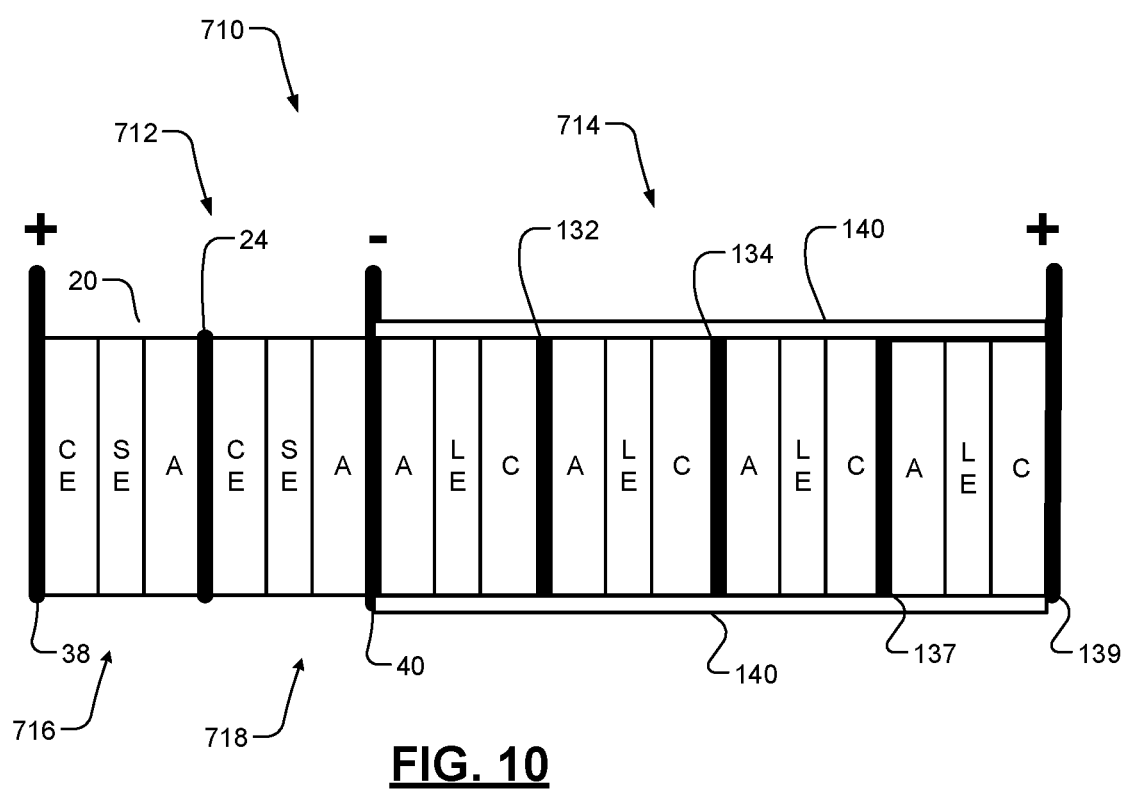

Referring now to FIGS. 9 and 10, the bipolar capacitor and the LIB or bipolar LIB can used solid and liquid electrolyte, respectively. In FIG. 9, a BCAB 610 includes a bipolar capacitor 612 and a LIB 614. The bipolar capacitor 612 comprises (in order of adjacent layers from left to right) the positive terminal 38, a first capacitor 616 including a capacitor electrode (CE), a solid electrolyte (SE), and an anode (A), the current collector 24, a second capacitor 618 including a capacitor electrode (CE), the solid electrolyte (SE), and an anode (A), and the negative terminal 40.

The LIB 614 abuts the negative terminal 40 of the bipolar capacitor 612 and includes (in order of adjacent layers from left to right) an anode (A), a liquid electrolyte (LE), a collector (C), the positive terminal 42, a collector (C), the liquid electrolyte (LE), an anode (A), the negative terminal 44, an anode (A), the liquid electrolyte (LE), a collector (C), the positive terminal 46, a collector (C), the liquid electrolyte (LE), an anode (A), and the negative terminal 48.

In FIG. 10, a BCAB 710 includes a bipolar capacitor 712 and a bipolar Li-Ion battery (LIB) 714. The bipolar capacitor 712 comprises (in order of adjacent layers from left to right) the positive terminal 38, a first capacitor 716 including a capacitor electrode (CE), a solid electrolyte (SE), and an anode (A), the current collector 24, a second capacitor 718 including a capacitor electrode (CE), the solid electrolyte (SE), and an anode (A), and the negative terminal 40.

The LIB 714 abuts the negative terminal 40 of the bipolar capacitor 712 and includes (in order of adjacent layers from left to right) an anode (A), a liquid electrolyte (LE), a collector (C), the current collector 132, an anode (A), the liquid electrolyte (LE), a collector (C), the current collector 134, an anode (A), the liquid electrolyte (LE), a collector (C), the current collector 137, an anode (A), the liquid electrolyte (LE), a collector (C), and the negative terminal 139.

Figure 11:
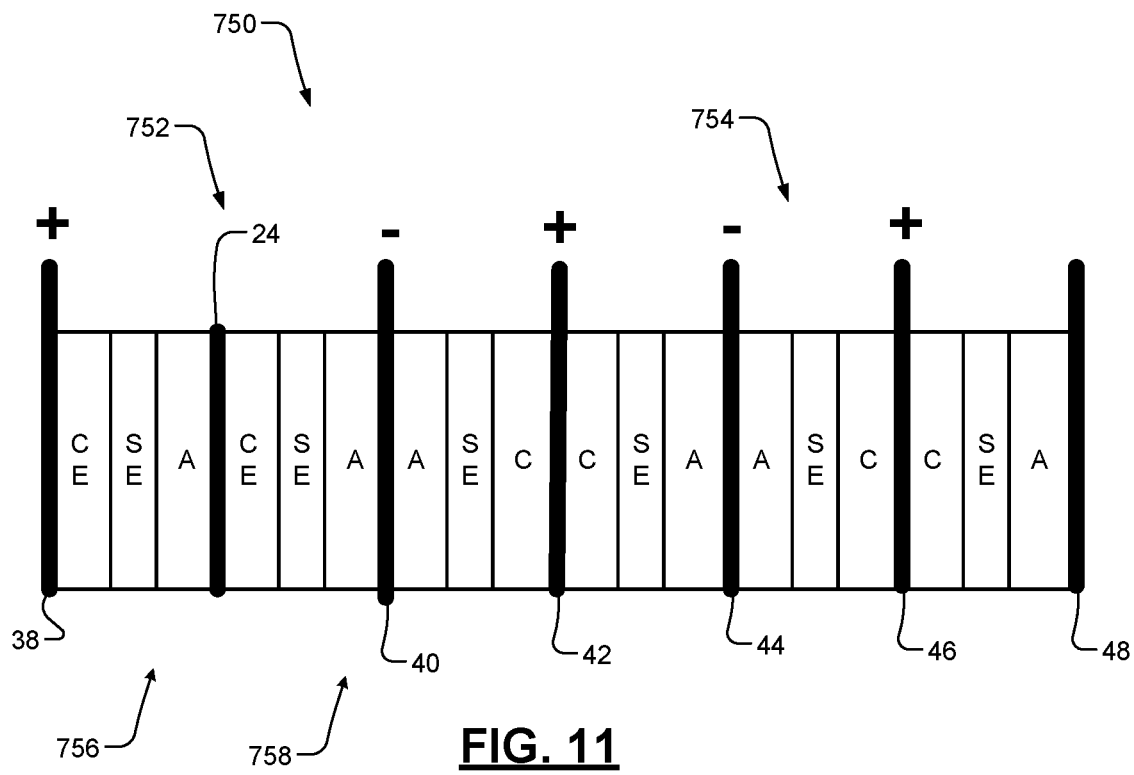
Figure 12:
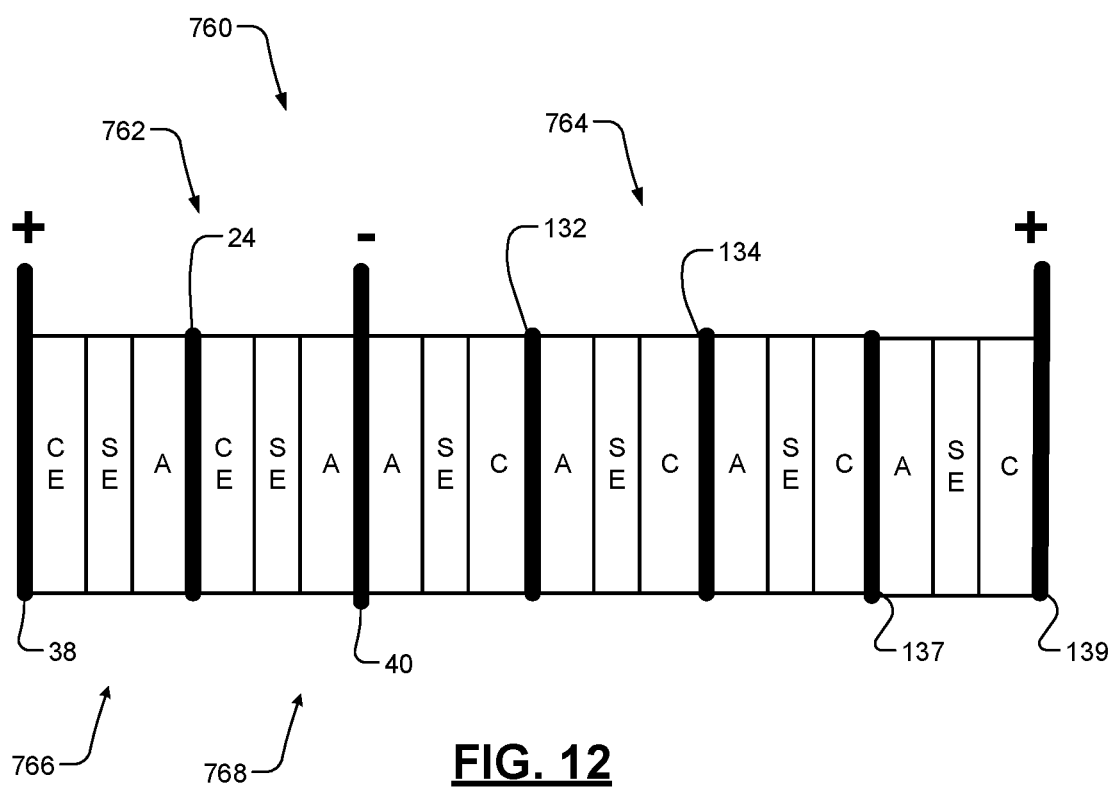

Referring now to FIGS. 11 and 12, the bipolar capacitor and the LIB or bipolar LIB use solid electrolyte. In FIG. 11, a BCAB 750 includes a bipolar capacitor 752 and a LIB 754. The bipolar capacitor 752 comprises (in order of adjacent layers from left to right) the positive terminal 38, a first capacitor 756 including a capacitor electrode (CE), a solid electrolyte (SE), and an anode (A), the current collector 24, a second capacitor 758 including a capacitor electrode (CE), the solid electrolyte (SE), and an anode (A), and the negative terminal 40.

The LIB 754 abuts the negative terminal 40 of the bipolar capacitor 752 and includes (in order of adjacent layers from left to right) an anode (A), a solid electrolyte (SE), a collector (C), the positive terminal 42, a collector (C), the solid electrolyte (SE), an anode (A), the negative terminal 44, an anode (A), the solid electrolyte (SE), a collector (C), the positive terminal 46, a collector (C), the solid electrolyte (SE), an anode (A), and the negative terminal 48.

In FIG. 12, a BCAB 760 includes a bipolar capacitor 762 and a bipolar Li-Ion battery (LIB) 764. The bipolar capacitor 762 comprises (in order of adjacent layers from left to right) the positive terminal 38, a first capacitor 766 including a capacitor electrode (CE), a solid electrolyte (SE), and an anode (A), the current collector 24, a second capacitor 768 including a capacitor electrode (CE), the solid electrolyte (SE), and an anode (A), and the negative terminal 40.

The LIB 764 abuts the negative terminal 40 of the bipolar capacitor 762 and includes (in order of adjacent layers from left to right) an anode (A), a solid electrolyte (SE), a collector (C), the current collector 132, an anode (A), the solid electrolyte (SE), a collector (C), the current collector 134, an anode (A), the solid electrolyte (SE), a collector (C), the current collector 137, an anode (A), the solid electrolyte (SE), a collector (C), and the negative terminal 139.

Figure 13:
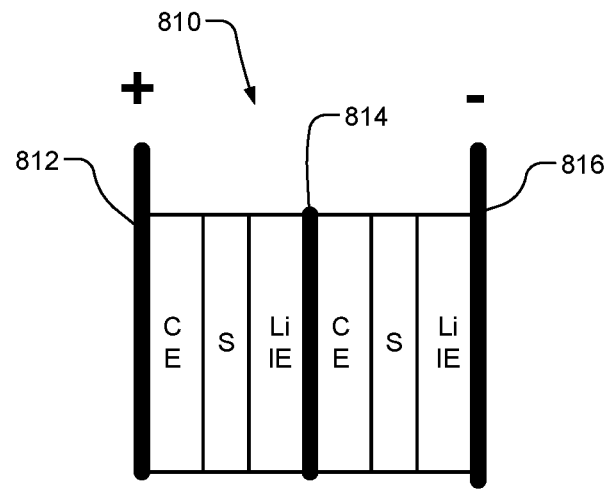
FIGS. 13-15 illustrate additional examples of bipolar capacitors according to the present disclosure.
Figure 14:
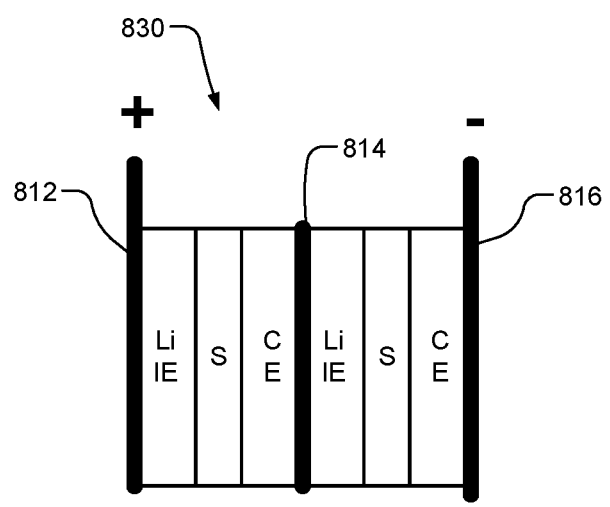
Figure 15:
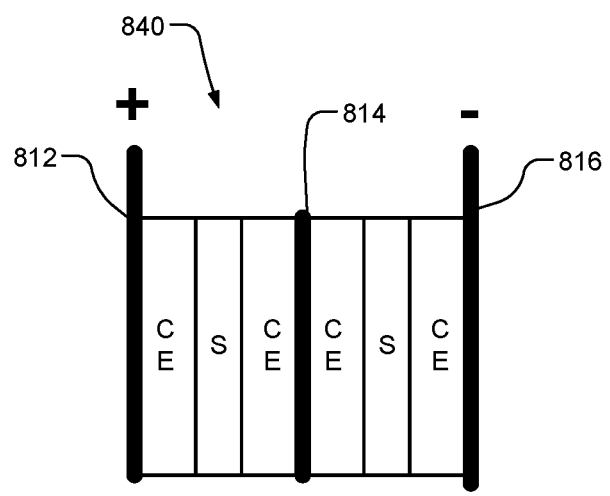

Referring now to FIGS. 13 to 15, the bipolar capacitor can have various different configurations. In FIGS. 13 and 14, the bipolar capacitor is a lithium ion capacitor (LIC). In FIG. 15, the bipolar capacitor is an electric double layer capacitor (EDLC).

In FIG. 13, a bipolar capacitor 810 includes a positive terminal 812, a capacitor electrode (CE), a separator (S), a Li-Ion insertion electrode (LiIE), a current collector 814, a capacitor electrode (CE), a separator (S) and a Li-Ion insertion electrode (LiIE), and a negative terminal 816.

In FIG. 14, a bipolar capacitor 830 includes the positive terminal 812, a Li-Ion insertion electrode (LiIE), a separator (S), a capacitor electrode (CE), a current collector 814, a Li-Ion insertion electrode (LiIE), a separator (S), a capacitor electrode (CE), and the negative terminal 816.

In some examples, the positive electrode/negative electrode of LIC bipolar capacitor include faradic active carbon (AC) and lithium titanium oxide (LTO), lithium manganese oxide (LMO) and AC, AC and graphite (Gr), and/or other suitable material combinations.

In FIG. 15, a bipolar capacitor 840 includes the positive terminal 812, a a capacitor electrode (CE), a separator (S), a capacitor electrode (CE), a current collector 814, a capacitor electrode (CE), a separator (S), a capacitor electrode (CE), and the negative terminal 816. In some examples, the positive electrode/negative electrode couple include non-faradic AC and AC and/or other suitable material combinations.

In other examples, a bipolar capacitor can include EDLC/LIC pseudo-capacitance such as AC and manganese oxide ($MnO_2$), $MnO_2$ and AC, AC and nickel oxide (NiO), NiO and AC, and/or other suitable material combinations.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A bipolar capacitor assisted battery, comprising:
    a bipolar capacitor including:
        a first positive terminal;
        a first capacitor connected to the first positive terminal;
        a second capacitor; and
        a first negative terminal connected to the second capacitor,
        wherein the second capacitor is connected in series with the first capacitor; and
    a lithium ion battery connected in parallel to the bipolar capacitor and abutted against the first negative terminal of the bipolar capacitor, the lithium ion battery including a third anode abutted against the first negative terminal of the bipolar capacitor, a third separator connected to the third anode, a cathode connected to the third separator, and a second positive terminal connected to the cathode.

2. The bipolar capacitor assisted battery of claim 1, wherein:
    the first capacitor of the bipolar capacitor includes a first capacitor electrode directly connected to the first positive terminal, a first separator connected to the first capacitor electrode and a first anode connected to the first separator;
    the bipolar capacitor includes a current collector connected to the first anode;
    the second capacitor of the bipolar capacitor includes a second capacitor electrode connected to the current collector, a second separator connected to the second capacitor electrode, and a second anode; and
    the first negative terminal of the bipolar capacitor is directly connected to the second anode.

3. The bipolar capacitor assisted battery of claim 2, wherein the lithium ion battery comprises:
    a third anode connected to the first negative terminal, a third separator connected to the third anode and a first cathode connected to the third separator;
    a second positive terminal connected to the first cathode;
    a second cathode connected to the second positive terminal, a fourth separator connected to the second anode and a fourth anode connected to the fourth separator;
    a second negative terminal connected to the fourth anode;
    a fifth anode connected to the second negative terminal, a fifth separator connected to the fifth anode and a third cathode connected to the fifth separator;
    a third positive terminal connected to the third cathode; and
    a fourth cathode connected to the third positive terminal, a sixth separator connected to the fourth cathode and a sixth anode connected to the sixth separator.

4. The bipolar capacitor of claim 2, further comprising a blocking material arranged on at least the first separator of the first capacitor and the second separator of the second capacitor.

5. The bipolar capacitor of claim 3, wherein the bipolar capacitor uses a first liquid electrolyte and the lithium ion battery uses the first liquid electrolyte.

6. The bipolar capacitor of claim 3, wherein the bipolar capacitor uses a first liquid electrolyte and the lithium ion battery uses a second liquid electrolyte that is different than the first liquid electrolyte.

7. The bipolar capacitor of claim 3, wherein the bipolar capacitor uses a liquid electrolyte and the lithium ion battery uses a solid electrolyte.

8. The bipolar capacitor of claim 3, wherein the bipolar capacitor uses a solid electrolyte and the lithium ion battery uses a liquid electrolyte.

9. The bipolar capacitor of claim 3, wherein the bipolar capacitor uses a solid electrolyte and the lithium ion battery uses a solid electrolyte.

10. The bipolar capacitor assisted battery of claim 2, wherein the lithium ion battery is bipolar and includes M lithium ion batteries connected in series, where M is an integer greater than one.

11. The bipolar capacitor assisted battery of claim 2, wherein the cathode is a first cathode and the lithium ion battery comprises:
- a first current collector connected to the first cathode;
- a fourth anode connected to the first current collector, a fourth separator connected to the fourth anode and a second cathode connected to the fourth separator;
- a second current collector connected to the second cathode;
- a fifth anode connected to the second current collector, a fifth separator connected to the fifth anode and a third cathode connected to the fifth separator; and
- a second positive terminal connected to the third cathode.

12. The bipolar capacitor of claim 11, further comprising a blocking material arranged on at least the first separator, the second separator and the third separator of the lithium ion battery.

13. The bipolar capacitor of claim 11, wherein the bipolar capacitor uses a first liquid electrolyte and the lithium ion battery uses the first liquid electrolyte.

14. The bipolar capacitor of claim 11, wherein the bipolar capacitor uses a first liquid electrolyte and the lithium ion battery uses a second electrolyte that is different than the first liquid electrolyte.

15. The bipolar capacitor of claim 11, wherein the bipolar capacitor uses a first liquid electrolyte and the lithium ion battery uses a second electrolyte that is different than the first liquid electrolyte.

16. The bipolar capacitor of claim 11, wherein the bipolar capacitor uses a solid liquid electrolyte and the lithium ion battery uses a liquid electrolyte.

17. The bipolar capacitor of claim 11, wherein the bipolar capacitor uses a liquid electrolyte and the lithium ion battery uses a solid electrolyte.

18. The bipolar capacitor of claim 11, wherein the bipolar capacitor uses a solid electrolyte and the lithium ion battery uses a solid electrolyte.

19. The bipolar capacitor of claim 1, wherein the bipolar capacitor comprises a lithium ion capacitor (LIC).

20. The bipolar capacitor of claim 1, wherein the bipolar capacitor comprises an electric double layer capacitor (EDLC).

* * * * *